(12) United States Patent
Tao et al.

(10) Patent No.: US 11,836,170 B1
(45) Date of Patent: Dec. 5, 2023

(54) MACHINE LEARNING-BASED SYSTEMS AND METHODS FOR SYNTHESIZING DIGITAL CORRESPONDENCES AND TRANSACTIONAL ARTIFACTS

(71) Applicant: Trusli Inc., Middletown, DE (US)

(72) Inventors: Meng Tao, San Francisco, CA (US); Yi Qiao, Saratoga, CA (US)

(73) Assignee: Trusli Inc., Middleton, DE (US)

( * ) Notice: Subject to any disclaimer, the term of this patent is extended or adjusted under 35 U.S.C. 154(b) by 0 days.

(21) Appl. No.: 18/215,823

(22) Filed: Jun. 29, 2023

Related U.S. Application Data

(60) Provisional application No. 63/456,935, filed on Apr. 4, 2023.

(51) Int. Cl.
*G06F 16/332* (2019.01)
(52) U.S. Cl.
CPC .................................. *G06F 16/3329* (2019.01)
(58) Field of Classification Search
CPC .......................... G06F 16/3329; G06F 16/332
See application file for complete search history.

(56) References Cited

U.S. PATENT DOCUMENTS

| | | | |
|---|---|---|---|
| 2023/0031461 A1* | 2/2023 | Weissenberger | G10L 15/22 |
| 2023/0153541 A1* | 5/2023 | Carbajales | G06F 18/2178 |
| | | | 704/9 |

* cited by examiner

*Primary Examiner* — Huyen X Vo
(74) *Attorney, Agent, or Firm* — Padowithz Alce; Quintin Scheitlin; Alce PLLC

(57) ABSTRACT

A system and method includes identifying unstructured conversational dialogue data sourced from communications between a subscriber and a conversational dialogue agent; automatically mapping, via the one or more computers, one or more distinct unstructured data synthetization requests defined in the unstructured conversational dialogue data to a distinct artifact synthetization objective defined within a synthetization objective distillation layer; generating, via the one or more computers, a plurality of artifact synthetization prompts corresponding to the plurality of unstructured synthetization data requests based on the distinct artifact synthetization objective mapped to each of the one or more distinct unstructured synthetization data requests; and generating, by a target machine learning model, a plurality of synthesized digital artifacts based on an input of the plurality of artifact synthetization prompts generated for the plurality of unstructured synthetization data requests.

19 Claims, 6 Drawing Sheets

Procurement Email Generation

| | | |
|---|---|---|
| Recipient: | Johnny Appleseed | Dear Johnny Appleseed,<br><br>Thank you for sending us the quote. After reviewing it, we have some suggestions:<br><br>- We have done research on comparable suppliers and offerings. Would it be possible to receive a 30% discount on the quote?<br><br>- If we purchase more than 10 licenses, can we receive a volume discount?<br><br>- We would also like to request that the support and maintenance fee be waived.<br><br>- Could we extend the payment term to 30 days?<br><br>- Additionally, we would like to delete the auto renewal provision from the contract.<br><br>- Lastly, we would like to be able to cancel our purchase whenever we choose. Can you include this in the terms?<br><br>At Acme Co., we consider our suppliers to be strategic partners. We are striving to find a mutually beneficial solution. We appreciate your flexibility and look forward to creating a longer-term relationship with you.<br><br>Best,<br>Jane Appleseed |
| Target Discount Rate: | 30% | |
| Minimum number of licenses required to qualify for a volume discount: | 10 | |
| Payment Term: | 30 days | |

FIGURE 5

NDA Email Generation

Recipient: Johnny Appleseed

Proposed Changes

Jurisdiction: New York

Duration: 5 years

Dear Johnny Appleseed,

Thank you for sending us your markup of our NDA. We have reviewed and made two minor changes.

1. We would like to extend the term to at least five years. This provides us with a sufficient time frame to protect our confidential information.

2. While we understand your preference for your own jurisdiction and governing law, we suggest New York as a neutral jurisdiction that is more accommodating for both parties.

At Acme Co., we consider our suppliers to be strategic partners. We are striving to find a mutually beneficial solution. We appreciate your flexibility and look forward to creating a longer-term relationship with you.

Best,
Jane Appleseed

FIGURE 6

MACHINE LEARNING-BASED SYSTEMS AND METHODS FOR SYNTHESIZING DIGITAL CORRESPONDENCES AND TRANSACTIONAL ARTIFACTS

CROSS-REFERENCE TO RELATED APPLICATIONS

This application claims the benefit of U.S. Provisional Application No. 63/456,935, filed on 4 Apr. 2023, which is incorporated in its entirety by this reference.

TECHNICAL FIELD

This invention relates generally to the computer-based learning field, and more specifically, to new and useful systems and methods for intelligently synthesizing digital correspondences and transactional artifacts.

BACKGROUND

Conventional artifact drafting workflows are highly manual and inefficient. Typical artifact drafting processes or workflows involve a human expert iteratively authoring textual content in a word processing application and carefully reviewing such textual content to ensure the intended tone, formality, clarity, or other writing characteristics are achieved. This slow and tedious process is not only time-intensive and burdensome, but also fails to scale in instances where a user needs to compose an extensive number of artifacts.

Accordingly, there is a need for new and useful systems and methods that use machine learning models to automatically synthesize digital artifacts, including digital correspondences and transactional artifacts. The embodiments of the present application, described herein, provide technical solutions that at least address the needs described above, as well as the deficiencies of the state of the art.

BRIEF DESCRIPTION OF THE FIGURES

FIGS. 5 and 6 illustrates example synthesized digital correspondences in accordance with one or more embodiments of the present application.

BRIEF SUMMARY OF THE INVENTION(S)

Figure 1:
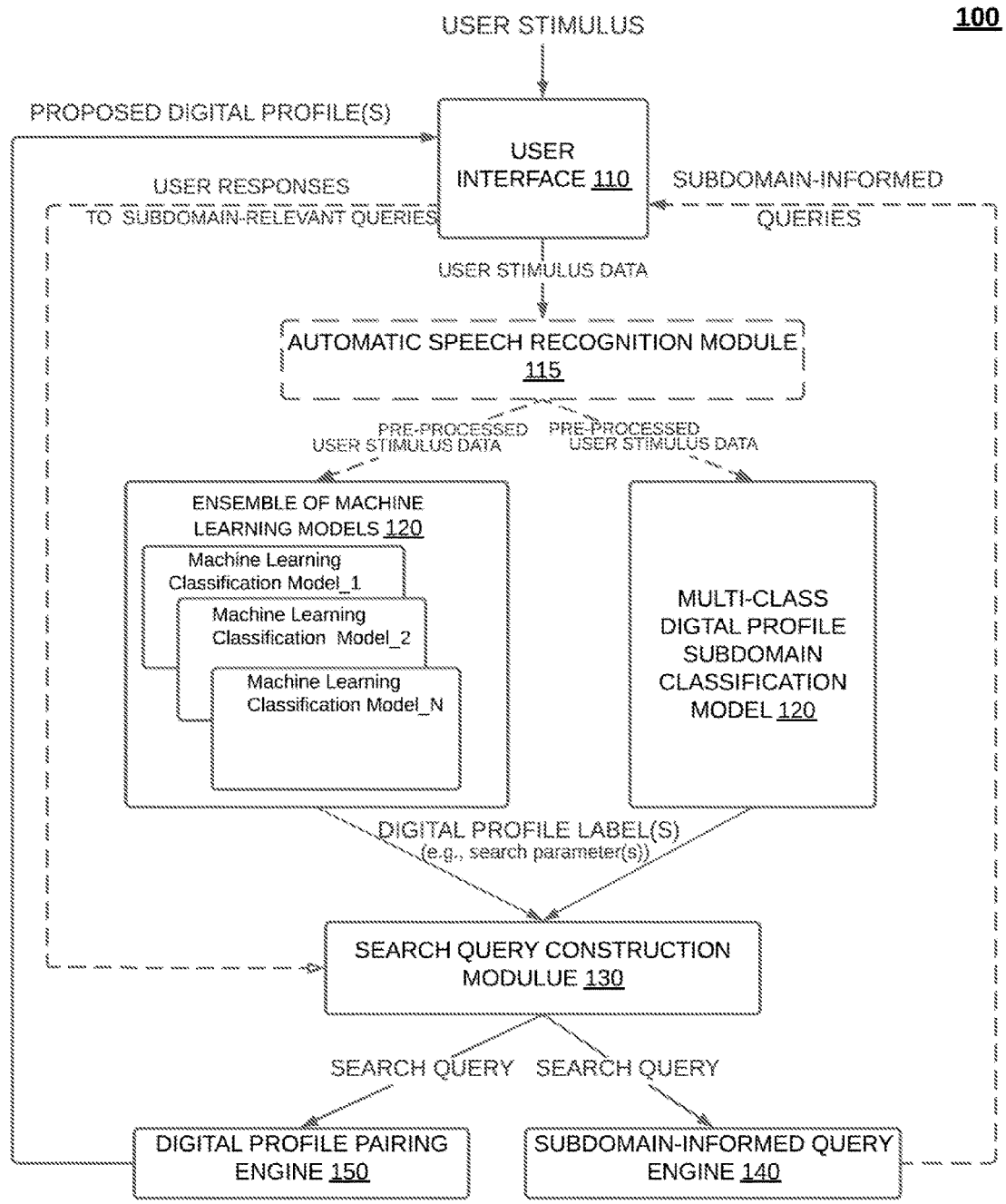
FIG. 1 illustrates a schematic representation of a system 100 in accordance with one or more embodiments of the present application.

In some embodiments, a method for composing a plurality of artifact synthetization prompts for synthesizing a plurality of digital artifacts includes identifying, via one or more computers, unstructured conversational dialogue data sourced from communications between a subscriber and a conversational dialogue agent, wherein the conversational dialogue data comprises a plurality of distinct unstructured data synthetization requests; automatically mapping, via the one or more computers, each of the plurality of distinct unstructured data synthetization requests to a distinct artifact synthetization objective of a plurality of distinct artifact synthetization objectives defined within a synthetization objective distillation layer, wherein each of the plurality of distinct synthetization objectives is stored in association with: computer-executable artifact synthetization prompt creation instructions that, when executed, generates an artifact synthetization prompt for synthesizing a target digital artifact, and a corpora of synthetization parameters required by the computer-executable artifact synthetization prompt creation instructions; generating, via the one or more computers, a plurality of artifact synthetization prompts corresponding to the plurality of unstructured synthetization data requests based on the distinct artifact synthetization objective mapped to each of the plurality of distinct unstructured synthetization data requests, wherein the generating includes extracting, from the unstructured conversational dialogue data, a plurality of synthetization values for the plurality of synthetization parameters required by the distinct artifact synthetization objective; setting programmable synthetization arguments defined in the computer-executable artifact synthetization prompt creation instructions associated with the distinct artifact synthetization objective based on the plurality of synthetization values extracted from the unstructured conversational dialogue data; and executing the computer-executable artifact synthetization prompt creation instructions associated with the distinct artifact synthetization objective mapped to each of the plurality of distinct unstructured synthetization data requests based on the setting of the programmable synthetization arguments defined in computer-executable artifact synthetization prompt creation instructions; and generating, by a target machine learning model, a plurality of synthesized digital artifacts based on an input of the plurality of artifact synthetization prompts generated for the plurality of unstructured synthetization data requests.

In some embodiments, each of the plurality of artifact synthetization prompts defines a corpus of features that the subscriber is requesting to be represented or incorporated in the target digital artifact synthesized by the target machine learning model, and the corpus of features that the subscriber is requesting to be represented or incorporated in the target digital artifact is further derived based on adaptations that the subscriber made to one or more target artifacts received from a target entity.

In some embodiments, the target machine learning model comprises a large language model, and the large language model is configured to receive each of the plurality of artifact synthetization prompts as input and generate, as output, a synthesized digital artifact for each of the plurality of artifact synthetization prompts provided as input.

In some embodiments, the target machine learning model composes one or more words, sentences, and paragraphs based on feature data defined in each respective synthetization prompt, and the feature data defines one or more values for one or more features that the subscriber is requesting to be represented in the target digital artifact synthesized by the target machine learning model.

In some embodiments, the target machine learning model comprises a large language model that is trained on real digital correspondence data associated with the subscriber and synthetic correspondence data derived from the real digital correspondence data, a correspondence data simulation layer generates the synthetic correspondence data, and generating the synthetic correspondence data via the correspondence data simulation layer includes: obtaining, from the synthetization objective distillation layer, a corpus of procurement correspondence features and possible feature values of each procurement correspondence feature in the corpus of procurement correspondence features; generating one or more synthetic correspondence creation prompts that comprises a real digital correspondence and a request to rewrite one or more procurement correspondence features defined in the real digital correspondence with different feature values; and generating the synthetic correspondence data based on providing the one or more synthetic correspondence creation prompts as input to the large language model.

In some embodiments, a respective one of the plurality of unstructured data synthetization requests is mapped to a digital correspondence synthetization request, an artifact synthetization prompt generated for the respective one of the plurality of unstructured data synthetization requests includes: a recipient feature, a requested discount rate feature, a requested volume discount feature, and a requested payment term feature, and the target machine learning model automatically composes one or more words, sentences, and paragraphs based on the recipient feature, the requested discount rate feature, and the requested volume discount feature.

In some embodiments, a respective one of the plurality of unstructured data synthetization requests is mapped to a transactional artifact adaptation correspondence synthetization request, an artifact synthetization prompt corresponding to the respective one of the plurality of unstructured data synthetization requests includes a recipient feature, a requested jurisdiction feature, a requested contract duration feature, and the target machine learning model automatically composes one or more words, sentences, and paragraphs based on the recipient feature, the requested jurisdiction feature, and the requested contract duration feature.

In some embodiments, the target machine learning model comprises a large language model that is trained on real transactional artifact data associated with the subscriber and synthetic transactional artifact data derived from the real transactional artifact data, a transactional artifact data simulation layer generates the synthetic transactional artifact data, and generating the synthetic transactional artifact data via the transactional artifact data simulation layer includes: obtaining, from the synthetization objective distillation layer, a corpus of transactional artifact features and possible feature values of each feature in the corpus of transactional artifact features; generating one or more transactional artifact creation prompts that comprises a real transactional artifact and a request to rewrite one or more transactional artifact features defined in the real transactional artifact with different feature values; and generating the synthetic transactional artifact data based on providing the one or more transactional artifact creation prompts as input to the large language model.

In some embodiments, a respective one of the plurality of distinct unstructured data synthetization requests is automatically mapped to a digital correspondence synthetization objective, the target digital artifact synthesized via the computer-executable artifact comprises a synthesized response to digital quote data provided by a target procurement supplier, and the corpora of synthetization parameters required by the computer-executable artifact synthetization prompt creation instructions include synthetization parameter identifying a recipient to identify in the response to the digital quote data, a synthetization parameter identifying a discount amount to request in the synthesized response to the digital quote data, a synthetization parameter identifying a volume discount amount to request in the synthesized response to the digital quote data, and a synthetization parameter identifying a payment term to request in the synthesized response to the digital quote data.

In some embodiments, a respective one of the plurality of distinct unstructured data synthetization requests is automatically mapped to a digital correspondence synthetization objective, the target digital artifact synthesized via the computer-executable artifact synthetization prompt creation instructions associated with the digital correspondence synthetization objective comprises a synthesized response to transactional artifact data provided by a target entity, and the corpora of synthetization parameters required by the computer-executable artifact synthetization prompt creation instructions include a synthetization parameter identifying a recipient to identify in the synthesized response to the transactional artifact data, a synthetization parameter identifying a jurisdiction to request in the synthesized response to the transactional artifact data, and a synthetization parameter identifying a time duration to request in the synthesized response to the transactional artifact data.

In some embodiments, a computer-implemented method includes identifying unstructured conversational dialogue data sourced from communications between a subscriber and a conversational dialogue agent; automatically mapping one or more distinct unstructured data synthetization requests defined in the unstructured conversational dialogue data to a distinct artifact synthetization objective defined within a synthetization objective distillation layer; generating a plurality of artifact synthetization prompts corresponding to the plurality of unstructured synthetization data requests based on the distinct artifact synthetization objective mapped to each of the one or more distinct unstructured synthetization data requests; and generating, by a target machine learning model, a plurality of synthesized digital artifacts based on an input of the plurality of artifact synthetization prompts generated for the plurality of unstructured synthetization data requests.

In some embodiments, the synthetization objective distillation layer defines a plurality of distinct artifact synthetization objectives, and each of the plurality of distinct synthetization objectives includes computer-executable artifact synthetization prompt creation instructions that, when executed, generates a target artifact synthetization prompt, and a corpora of synthetization parameters required by the computer-executable artifact synthetization prompt creation instructions.

In some embodiments, the generating includes extracting, from the unstructured conversational dialogue data, a plurality of synthetization values for a plurality of synthetization parameters required by the distinct artifact synthetization objective; setting programmable synthetization arguments defined in the computer-executable artifact synthetization prompt creation instructions based on the plurality of synthetization values extracted from the unstructured conversational dialogue data; and executing the computer-executable artifact synthetization prompt creation instructions associated with the distinct artifact synthetization objective mapped to each of the plurality of distinct unstructured synthetization data requests based on the setting of the programmable synthetization arguments.

In some embodiments, the target machine learning model composes one or more words, sentences, and paragraphs based on feature data defined in a respective artifact synthetization prompt, and the feature data defines one or more values for one or more features that the subscriber is requesting to be represented in the target digital artifact synthesized by the target machine learning model.

In some embodiments, the target machine learning model comprises a large language model that is trained on real subscriber data and synthetic subscriber data derived from the real subscriber data, a data simulation layer generates the synthetic subscriber data, and generating the synthetic subscriber data via the data simulation layer includes obtaining, from the synthetization objective distillation layer, a corpus of features and possible feature values of each feature in the corpus; generating one or more synthetic subscriber data creation prompts that comprise a real subscriber data and a request to rewrite one or more features defined in the real subscriber data with different feature values; and generating the synthetic subscriber data based on providing the one or more synthetic subscriber data creation prompts as input to the large language model.

In some embodiments, the data simulation layer is an intermediary between the subscriber and the large language model and enables the subscriber to adapt the large language model according to one or more subscriber training preferences or goals.

In some embodiments, defining a base data layer for the conversational dialog agent and the target machine learning model, wherein defining the base data layer includes sourcing a plurality of unstructured artifacts from the subscriber, converting the plurality of unstructured artifacts to a corpora of structured data, and automatically defining, in the base data layer, a plurality of synthetization policies that constrain synthetization operations of the conversational dialogue agent and the target machine learning model.

In some embodiments, a computer-implemented method for composing a plurality of artifact synthetization prompts for synthesizing a plurality of digital artifacts includes identifying, via one or more computers, unstructured conversational dialogue data; generating, via the one or more computers, a plurality of artifact synthetization prompts based on the unstructured conversational dialogue data, wherein the generating includes extracting, from the unstructured conversational dialogue data, a plurality of synthetization values from the unstructured conversational dialogue data; setting programmable synthetization arguments defined in computer-executable artifact synthetization prompt creation instructions based on the plurality of synthetization values extracted from the unstructured conversational dialogue data; and executing the computer-executable artifact synthetization prompt creation instructions based on the setting of the programmable synthetization arguments; and generating, by a target machine learning model, a plurality of synthesized digital artifacts based on an input of the plurality of artifact synthetization prompts generated for the plurality of unstructured synthetization data requests.

In some embodiments, the plurality of artifact synthetization prompts further includes automatically mapping, via the one or more computers, each of a plurality of distinct unstructured data synthetization requests defined in the unstructured conversational dialogue data to a distinct artifact synthetization objective of a plurality of distinct artifact synthetization objectives defined within a synthetization objective distillation layer.

In some embodiments, the target machine learning model comprises a large language model that is trained on real subscriber data and synthetic subscriber data derived from the real subscriber data, a data simulation layer generates the synthetic subscriber data, and generating the synthetic subscriber data via the data simulation layer includes obtaining, from the synthetization objective distillation layer, a corpus of features and possible feature values of each feature in the corpus; generating one or more synthetic subscriber data creation prompts that comprises a real subscriber data and a request to rewrite one or more features defined in the real subscriber data with different feature values; and generating the synthetic subscriber data based on providing the one or more synthetic subscriber data creation prompts as input to the large language model.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Machine Learning-Based Pairings of User Stimuli-to-Digital Profile Data As shown in FIG. 1, a system 100 for machine learning-based pairing of user stimuli-to-digital profiles may include a user interface no, a machine learning-based classification system 120, a search query construction module 130, a subdomain-informed query engine 140, and a digital profile pairing engine 150. The system 100 may optionally include an automatic speech recognition module 115. The system 100 may sometimes be referred to herein as a service provider discovery service 100, a user content-to-digital account pairing service 100, or an online digital profile discovery service 100. As described in more detail herein, the service provider discovery service 100 may enable a discovery of any suitable online digital profile data and/or related online digital profile content for a plurality of distinct service provider digital profiles including, but not limited to, lawyer-service provider profiles, health care-service provider profiles, financial services-service provider profiles, insurance services-service provider profile, and/or the like.

In one or more embodiments, each module or engine of the system 100 may be implemented by one or more computing servers, one or more computing processors, or computing servers of a distributed computing system.

1.1 User Interface

In one or more embodiments, the system or service 100 may function to implement a user interface 110 that may preferably function to identify, collect, or ingest user input in any form. The user interface 110 may comprise a search interface that may be digitally accessible to online users over a computing medium, such as the world wide web or the internet. In one or more embodiments, the online users that may be interacting with the user interface 110 may input a user query in the form of text input, utterance input, and/or image input, and the user interface 110 may function to identify, collect, or ingest the user query.

In one or more embodiments, the user interface 110 may be implemented via any suitable computing device and/or from including, but not limited to, a mobile computing device, a personal computing device, a web-browser (having a website displayed therein), or the like. In some embodiments, the user interface 110 may function to implement one or more graphical user interface objects that may enable online users to continuously or periodically interact with the system 100 via the user interface 110. For instance, the user interface 110 may function to implement one or more text input fields into which online users may freely (e.g., manually) enter a user query (e.g., a user stimulus, a user input, or the like). In one or more embodiments, the user interface 100 may be enabled by a client application operating on a mobile computing device or the like. In such embodiments, the client application may be in operable communication with a client server of the system 100.

In one or more embodiments, based on identifying input of the user query at the user interface 110 (e.g., an Internet-accessible user interface), the user query data associated with the user query may be routed to a machine learning-based classification system and, in some embodiments, the user query data may be optionally routed to an automatic speech recognition module 115 that may convert the user query to text before routing the user query data to the machine learning-based classification system, if needed.

1.2 Machine Learning-Based Inference System|Machine Learning-Based Digital Profile Subdomain Inference System In one or more embodiments, the system 100 may function to implement a machine learning-based digital profile inference system 120 that may preferably function to generate inferences (e.g., classification inferences, including classification labels, entity or slot extraction inferences, and/or the like) (or classify) a target piece of user stimulus data (e.g., pre-processed user stimulus data) into one or more digital profile subdomain categories. The machine learning-based digital profile inference system 120, which may be sometimes referred to herein as a machine learning-based digital profile classification system 120 may be trained for interpreting the user query (e.g., human text), extracting features from the user query, and/or computing digital profile subdomain classification predictions based on the extracted features.

In one or more embodiments, an algorithmic structure underlying the machine learning-based digital profile classification system 120 may be a multi-class digital profile subdomain classification model or an ensemble of digital profile classification models. In one or more embodiments, the multi-class digital profile subdomain classification model may be algorithmically configured and/or specifically trained to generate predictions and/or inferences across a plurality of distinct categories or classes of distinct digital profiles. Accordingly, in such embodiments, the multi-class classification model may function to search unique combination of distinct classes of profiles based on search query input data. The multi-class digital profile subdomain classification model or the ensemble of digital profile classification models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., nave Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

In one or more embodiments, the classification inference(s) of the machine learning-based digital profile classification system 120 may function to label a target piece of user stimulus data into one or more digital profile subdomain categories that may be used, as input, to a downstream module (e.g., the search query construction module) or engine (e.g., the digital profile pairing engine, the subdomain-informed query engine).

1.3 Search Query Construction Module

In one or more embodiments, the system 100 may function to implement a search query construction module 130 that may preferably function to construct one or more search queries for a target piece of user stimulus data. In one or more embodiments, the search query construction module may function to derive search parameters (for a target piece of user stimulus data) based on the machine learning-based classification label(s) or machine learning-based classification inference(s) predicted by the machine learning-based digital profile classification system 120. In one or more embodiments, the one or more search queries constructed by the search query construction module 130 may be in a machine-understandable format or syntax according to a prescribed search format or search syntax required by at least one of the digital profile pairing engine 150 or the subdomain-informed query engine 140.

In one or more embodiment, the search query construction module may function to construct a subdomain-informed search query that, when executed, may function to search a database comprising a corpus of subdomain-informed query data and match (or pair) the subdomain-informed search query to one or more subdomain-informed queries based on the search parameters of the subdomain-informed query. Additionally, or alternatively, in one or more embodiments, the search query construction module 130 may function to construct a digital profile search query (or digital account search query) that, when executed, may function to automatically search a database comprising a corpus of digital profile data and pair (or match) the digital profile search query to one or more digital profiles data sets (e.g., a plurality of service provider digital profiles, a plurality of digital accounts, or the like).

1.4 Subdomain-Informed Query Engine

In one or more embodiments, the system 100 may function to implement a subdomain-informed query engine 140 that may preferably function to selectively identify and pose one or more subdomain-informed queries to a target online user of the system or service 100. In one or more embodiments, the subdomain-informed query engine 140 may comprise a database comprising a corpus of subdomain-informed query data. In one or more embodiments, the corpus of subdomain-informed query data may be searched using the subdomain-informed search query (e.g., the search parameters of the subdomain-informed search query) constructed by the search query construction module 130. The corpus of subdomain-informed query data may include subdomain-informed queries indexed according to a corresponding digital profile subdomain classification label (e.g., the corpus of subdomain query data may include a plurality of distinct digital profile subdomain classification labels and a distinct set of subdomain-informed queries digitally mapped (or electronically linked) to each of the plurality of distinct digital profile subdomain classification labels).

In one or more embodiments, the subdomain-informed query engine 140 may function to selectively match or selectively pair a subset of subdomain-informed queries of the plurality of subdomain-informed queries of the corpus of subdomain-informed query data to a target subdomain-informed search query. Accordingly, in one or more embodiments, the subset of subdomain-informed query data may be posed to the target user via the user interface 110.

1.5 Digital Profile Pairing Engine

In one or more embodiments, the system 100 may function to implement a digital profile pairing engine 150 that may preferably function to selectively identify and display, via an Internet-accessible user interface 110, one or more digital profiles to a target online user of the system or service 100. In one or more embodiments, the digital profile pairing engine 150 may comprise a database comprising a corpus of digital profile data. In one or more embodiments, the corpus of digital profile data may be searched using the digital profile search query (e.g., the search parameters of the digital profile search query) constructed by the search query construction module 130. The corpus of digital profile data may include digital profiles or digital accounts indexed according to the one or more distinct digital profile subdomain classification labels described above.

In one or more embodiments, the digital profile pairing engine 150 may function to selectively match or selectively pair a subset of digital profiles (e.g., digital accounts) of the plurality of digital profiles (e.g., digital accounts) of the corpus of digital profile data to a target digital profile search query that may be displayed to a target user via the user interface no.

Figure 2:
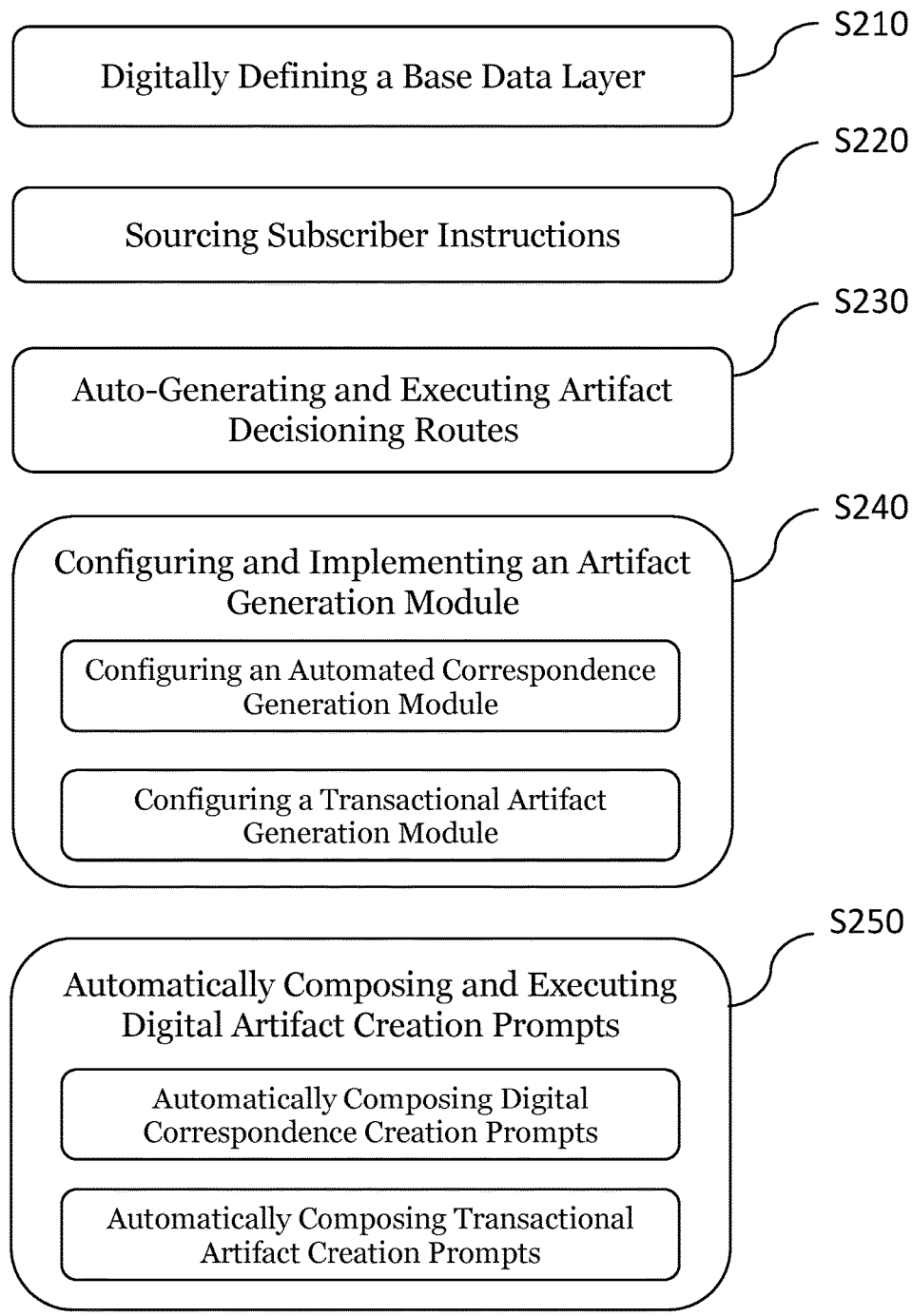
FIG. 2 illustrates an example method 200 in accordance with one or more embodiments of the present application.

2. Machine Learning-Based Method for Synthesizing Digital Correspondences and Transactional Artifacts As shown in FIG. 2, a machine learning-based method 200 for synthesizing digital correspondences and transactional artifacts may include constructing a base data layer (S210), sourcing subscriber instructions (S220), auto-generating and executing artifact decisioning routes (S230), configuring and implementing an artifact generation module that may be configured to synthesize digital correspondences and/or transactional artifacts (S240), and automatically composing and executing prompts specifically derived for synthesizing one or more digital correspondences and/or transactional artifacts (S250).

2.10 Digitally Defining a Base Data Layer

S210, which includes defining a base data layer, may function to build or construct a base data layer for a subscriber. In some embodiments, the base data layer constructed herein may relate to a knowledge base or repository that stores subscriber data in a structured manner. For instance, in a non-limiting example and once constructed, the base data layer may store (or include) contract data, purchase data, supplier data, budget data, industry data, supplier negotiation data, pricing data, and/or product data associated with one or more subscribers.

In some embodiments, such structured subscriber data may enable S210 to automatically define policies or constraints that govern operations of the method 200. Examples of policies that may be automatically defined based on the base data layer (and the structured subscriber data stored therein) may include, but should not be limited to, monetary spending policies that define fiscal spending constraints of a subscriber, purchase order intake policies that automate an assessment of purchase orders submitted to the subscriber, supplier sourcing policies that govern (negotiation) interactions with one or more entities (e.g., suppliers) suitable for fulfilling the purchase orders, and/or artifact drafting and revision policies that incorporate subscriber preferences when transacting with a selected entity (e.g., supplier).

Defining the Base Data Layer Based on Unstructured Artifacts

In some embodiments, defining the base data layer may include obtaining or sourcing a plurality of unstructured artifacts from the subscriber. The plurality of unstructured artifacts obtained or sourced from the subscriber, in some examples, may include one or more transactional artifacts executed between the subscriber and a target entity (e.g., contracts or the like), one or more correspondence artifacts or electronic communications between the subscriber and the target entity (e.g., emails, texts, messages, etc.), one or more purchase order artifacts that identify one or more digital or physical items bought from the target entity, and/or the like.

In some embodiments, upon or based on obtaining the plurality of unstructured artifacts from the subscriber, S210 may function to convert these unstructured artifacts to a corpora of structured data (e.g., extract a corpora of structured data from the unstructured artifacts). In one implementation of such embodiments, S210 may function to implement an ensemble of supervised or unsupervised machine learning models to convert the plurality of unstructured artifacts to a corpora of structured data. Example of supervised or unsupervised machine learning models underlying the ensemble may include, but may not be limited to, object detection machine learning models, object classification machine learning models, named entity recognition machine learning models, text classification machine learning models, extractive question-answering machine learning models, transformer-based machine learning models, and/or the like.

In some embodiments, S210 may function to automatically define (or suggest) policies to govern the operations of the method 200 based on the corpora of structured data extracted via the ensemble of supervised or unsupervised machine learning models. For instance, in a non-limiting example and based on extracting the corpora of structured data via the ensembled of supervised or unsupervised machine learning models, S210 may function to define a monetary budget policy that defines a maximum spend amount for the subscriber (e.g., {total_budget: $100,000.00}), a maximum spend for one or more entities, groups, organizations, or teams associated with the subscriber (e.g., [{teamA: $30,000.00}, {teamB: $20,000.00}, {teamC: $40,000.00}, {teamD: $10,000.00}]), a maximum spend amount for one or more asset categories associated with the subscriber [{computers: $5,000.00}, {software_applications: $3,000.00}, {cloud_services: $10,000.00}]), and/or the like. These derived or suggested policies may be based on an automated mapping or assessment of the structured data extracted from unstructured purchase data, transaction data, historical spend data, etc. uploaded by the subscriber to a system or service implementing the method 200.

It shall be noted that the above example(s) are not intended to be limiting and that S210 may construct additional or different governing policies than described without departing from the scope of the disclosure contemplated herein.

Figure 3:
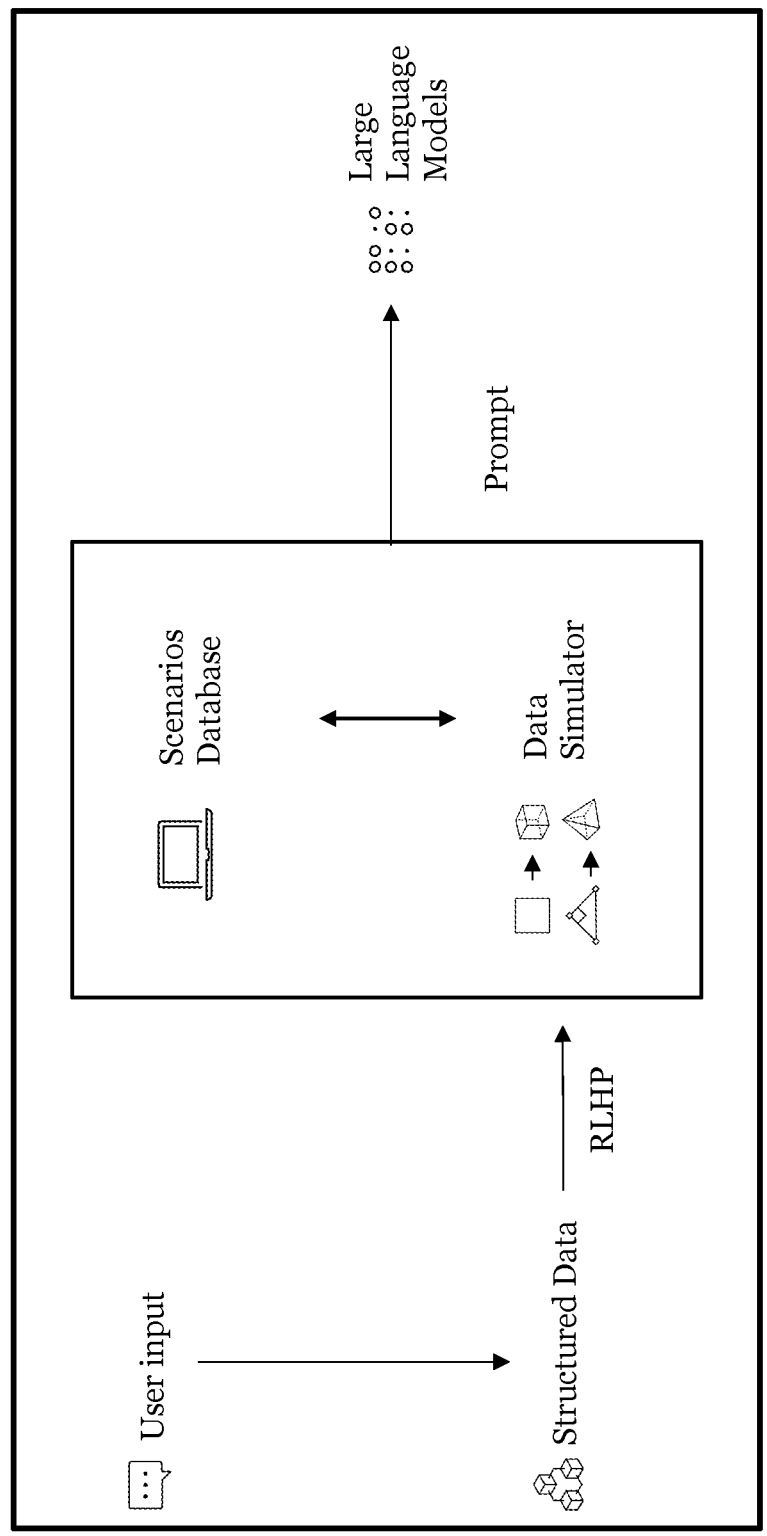
FIG. 3 illustrates a schematic for configuring and using a large language model to synthesize one or more digital artifacts in accordance with one or more embodiments of the present application.

Defining the Base Data Layer Based on a Conversational Dialogue with the Subscriber Additionally, or alternatively, in some embodiments, S210 may function to define the base data layer based on a conversational dialogue ("conversational dialogue data) between a subscriber and a conversational dialogue agent implemented by S210 (as generally illustrated in FIG. 3). The conversational dialogue agent, in some embodiments, may be configured to collect or receive input or queries that are optionally provided by the subscriber in response to one or more prompts generated by the conversational dialogue agent (also referred to herein as "synthetization requests" or the like). In some embodiments, the one or more prompts generated by the conversational dialogue agent may request the subscriber provide an answer or response to one or more requisite parameters (e.g., slots) required by the base data layer.

For instance, in a non-limiting example, the base data layer may require data (e.g., slots) related to a global or total spend amount of the subscriber, a total spend amount for one or more entities associated with the subscriber (e.g., teams, persons, business groups, etc.), and/or the like. Accordingly, in such a non-limiting example, the conversational dialogue agent may function to generate one or more prompts that request the data required by the base data layer, such as "Please provide a value of your total budget for fiscal year 2023 and the percentage allocated for each of your departments."

In some embodiments, a subscriber response to the one or more prompts may relate to an unstructured input that includes an answer to the one or more prompts generated via the conversational dialogue agent. That is, in some embodiments, a subscriber response to a prompt may include, but should not be limited to, speech input, utterance input, text input, character input, numerical input, image input, graphical input, and/or any other suitable type of input. For instance, with continued reference to the above non-limiting example, a subscriber response received in response to the prompt "Please provide a value of your total budget for fiscal year 2023 and the percentage allocated for each of your departments." may comprise text input such as "Our budget for the current fiscal year is $500,000.00 and that is distributed equally across Teams A, B, and C."

Extracting Requisite Slots and Identifying Unfilled Requisite Slots

In some embodiments, S210 (or the conversational dialogue agent) may function to extract values for the slots required by the base data layer from the subscriber response(s) and, in turn, store these extracted values as constraint parameters within the base data layer. For instance, in the above non-limiting example of a sample subscriber response, S210 function to extract the tokens "$500,000.00" as a value for the global budget amount slot required by the base data layer and define a total budget parameter for Teams A, B, and C in the base data layer in accordance with the instructions of the subscriber response (e.g., approximately $166,666.67 allocated to Teams A-C, respectively). It shall be noted that other slots or parameters required by the base data layer may be derived or extracted in similar ways described with respect to the global budget parameter and the team allocation parameters.

Furthermore, it shall also be noted that, in some embodiments, S210 may function to maintain a repository of unfilled slots or parameters required by the base data layer. In such embodiments, the conversational dialogue agent may periodically prompt the subscriber for the unfilled slots or parameters until (i) the conversational dialogue agent detects that the subscriber implicitly or explicitly declined to provide a value for such unfilled parameter(s) or (ii) the subscriber provided an input comprising a value for such unfilled parameter(s).

2.20 Digitally Sourcing Requisition Instructions||Digital Sourcing Subscriber Instructions S220, which includes sourcing requisition instructions, may function to source or obtain one or more (purchase or material) requisition instructions from one or more target users associated with the subscriber. In some embodiments, the one or more requisition instructions sourced herein may define purchasing requirements or purchasing needs of the target user, such as a name or identification (ID) value of one or more digital or physical items that the target user is requesting the subscriber to purchase, a quantity desired for each of the one or more digital or physical items, and/or the like. Furthermore, in some embodiments and as will be described in more detail herein, S220 may function to use the one or more requisition instructions to automatically construct a digital purchase order artifact that the subscriber requires for the one or more digital or physical items to be obtained (e.g., procured).

Sourcing the Requisition Instructions Via a Conversational Dialogue Agent

In some embodiments, S220 may implement a conversational dialogue agent to source the (material or purchase) requisition instructions from the target user. The conversational dialogue agent, in some embodiments, may be configured to prompt the user for one or more purchasing fields (e.g., parameters, attributes, or properties) associated with or required by the digital purchase order artifact and, in turn, use at least a portion of the user responses to the prompt(s) as values for the purchasing fields required by the digital purchase order artifact. Example required or optional purchasing fields associated with the digital purchase artifact will now be described. However, it shall be noted that the examples are not intended to be limiting and that the digital purchase artifact may include different, fewer, or additional purchasing fields without departing from the scope of the disclosure contemplated herein.

In some embodiments, the digital purchase order artifact may include a purchase order data field that identifies a name of a user associated with a creation of the digital purchase order artifact (e.g., purchase order creator), a purchase order data field that identifies a list of one or more entities (e.g., suppliers) associated with the digital purchase order artifact, a purchase order data field that identifies a list of one or more products associated with the digital purchase order artifact, one or more purchase order data field that identifies a quantity of each of the one or more products associated with the digital purchase order artifact, one or more purchase order data fields that identifies a unit price of each of the one or more products associated with the digital purchase order artifact, a purchase order data field that identifies terms and conditions associated with the digital purchase order artifact, and/or the like.

In some embodiments, S220 may function to maintain a list of required digital purchase order data fields that have not yet been provided by the target user. Thus, in some embodiments, when the user has not yet interacted with the conversational dialogue agent, the list maintained by S220 may include each digital purchase order data field required by the digital purchase order artifact (or all digital purchase order data fields associated with the digital purchase order artifact). It shall be noted that the list of required digital purchase order data fields may be stored in any suitable data structure, such as a database table, an array, a matrix, associative arrays, and/or the like.

In some embodiments, the conversational dialogue agent may be configured to generate one or more prompts to the target user based on the list of required digital purchase order data fields maintained by S220. For instance, for a target digital purchase order data field required by the digital purchase order artifact (e.g., an item(s) data field), the conversational dialogue agent may prompt the user for the target digital purchase order data field (e.g., "Please provide the item(s) you would like to purchase.", "What are the item(s) you would like to purchase?", and/or the like).

Based on the prompting, in some embodiments, the conversational dialogue agent may await a user response to the prompt. The user response to the prompt, in some embodiments, may comprise an (unstructured) answer to the prompt such as "I'd like to purchase a 14" MacBook Pro (Product ID #: ZYBHQER7890)," "I'd like to purchase a subscription to Office365 (Product ID #: QERCM-PAT456709)," and/or the like. In such embodiments, S220 may implement one or more supervised or unsupervised machine learning models (e.g., entity recognition, named entity recognition, text classification etc.) to extract tokens from the user response that are suitable values for the target digital purchase order data field. Additionally, or alternatively, in some embodiments, the user response may be automatically mapped to one of the synthetization objectives defined with the synthetization objective distillation layer described herein (e.g., mapped according to a classification inference computed for the user response (e.g., purchase request, transactional artifact synthetization request, correspondence synthetization request, etc.))

In some embodiments, the tokens that S220 extracts from the user response may be installed at corresponding locations within the digital purchase order artifact. For instance, with reference to the above non-limiting example, the token(s) '14" MacBook Pro (Product ID #: ZYBHQER7890)' and/or 'Office365 (Product ID #: QER-CMPAT456709)' may be extracted by the supervised or unsupervised machine learning models and automatically installed at locations corresponding to the target digital purchase order data field (e.g., installed as rows or elements within an item list, item table, item matrix, etc.).

In some embodiments, based on identifying a (valid) user response to a prompt for a target digital purchase order field/parameter, S220 may function to remove such field/parameter from the list of required digital purchase order data fields that have not yet been provided by the target user. Furthermore, in some embodiments, based on identifying a (valid) user response to a prompt, S220 may function to generate a new prompt for a next or subsequent digital purchase order data field that exists in the list. It shall be noted that the next or subsequent purchase digital order data field (and the digital order data fields thereafter) may be generated in a same or similar manner as described with respect to the target digital order data field. Similarly, the subscriber answer(s) to such next or subsequent digital purchase order data prompts may be identified, detected, extracted, and/or used in similar ways described with respect to the target digital order data field.

Alternatively, in a second implementation, upon the user providing one or more values for each of the one or more digital order data fields required by the digital purchase order artifact, S220 may then function to populate or install the one or more values provided by the user into the digital purchase order artifact. In some embodiments, each of the one or more digital order data fields may relate or map to a target section, region, component, list, table, page, element, input field or the like within the digital purchase order artifact. Thus, in some embodiments, installing the one or more values of the one or more digital order data fields into the digital purchase artifact may include installing the one or more values at the proper, correct, or corresponding section, region, component, list, table, element, input field.

2.30 Auto-Generating a Plurality of Automated Purchase Order (Material) Decisioning Workflow Routes S230, which includes auto-generating purchase order decisioning workflow routes, may function to automatically generate a plurality of distinct automated purchase order (workflow) decisioning routes that, in operation, route the one or more digital purchase order artifacts constructed by S220 to one or more target entities. In some embodiments, routing a digital purchase order artifact via a respective one of the plurality of distinct automated purchase ordering decisioning routes may cause or result in the respective digital purchase ordering route sending, transmitting, indicating, or otherwise notifying one or more entities associated with such route that the respective digital purchase order artifact is ready for review/assessment. To enable a review/assessment of the respective digital purchase order, in some embodiments, S230 may function to display the automatically constructed digital purchase order artifact in a graphical user interface that includes a plurality of selectable user interface elements that allow the user to accept (e.g., approve) the digital purchase order artifact or decline (e.g., reject) the digital purchase order artifact.

Additionally, or alternatively, in some embodiments, routing a digital purchase order artifact via a respective one of the plurality of distinct automated purchase order decisioning routes may cause or result in the respective digital purchase ordering route automatically accepting or declining the digital purchase order artifact (e.g., if such route is configured to perform such action).

Automatically Generating the Automated Purchase Order Decisioning Routes Based on a Conversational Dialogue In some embodiments, the plurality of distinct automated purchase order decisioning routes may be automatically generated based on a conversational dialogue between the subscriber and a conversational dialogue agent implemented by S230. The conversational dialogue agent, in some embodiments, may function to prompt the subscriber for parameters or slots required by S230 for generating such routes. Example parameters or slots required to automatically generate the plurality of distinct automated purchase ordering decisioning routes may include a route quantity slot that relates to or defines a total number of automated purchase ordering decisioning routes to generate or the like. Furthermore, in some embodiments, each distinct automated purchase ordering decisioning route may require a distinct set of slots or parameters to be filled. Non-limiting examples of such required slots or parameters may include, but should not be limited to, a route condition slot that relates to or defines an execution condition of a target automated purchase ordering decisioning route, a route action slot that relates to or defines an action or a set of actions associated with the target automated purchase ordering decisioning route, and/or the like.

In ways analogous to the embodiments described in S210-S220, S230 may function to maintain a list of route slots that have not yet been provided by the subscriber ("unfilled route slot list"). The unfilled route list, in some embodiments, may include all route slots required by S230 when the user has not yet interacted with the conversational dialogue agent or provided a (valid) value for any of the route slots required by S230. It shall be noted that the unfilled route slot list may be stored in any suitable data structure, such as a database table, an array, a matrix, associative arrays, and/or the like.

In some embodiments, the unfilled route slot list maintained by S230 may govern or guide the prompts generated by the conversational dialogue agent. For instance, in a non-limiting example, the unfilled route slot list may include a plurality of unfilled route slots, including the above-described route quantity slot. Thus, based on the route quantity slot existing within the unfilled route slot list, the conversational dialogue agent may prompt the user for the route quantity slot (e.g., "How many automated purchase order decisioning routes would you like generate?", "Please provide the number of automated purchase order decisioning routes would you like generate?", and/or the like).

In some embodiments, the conversational dialogue agent may be configured to wait for a subscriber response after or based on prompting the user for a respective slot. The subscriber response may be provided in the form text input, utterance input, or any other suitable structured or unstructured input. For instance, in a non-limiting example and with continued reference to the above example, the subscriber response to the prompt "How many automated purchase order decisioning routes would you like generate?" may be "I'd like to generate 3 automated purchase order decisioning routes." It shall be noted that the above example is not intended to be limiting and that the subscriber could optionally request additional or fewer purchase order decisioning routes to be generated without departing from the scope of the disclosure contemplated herein.

In some embodiments, based on identifying a (valid) subscriber response to a prompt for a slot, S230 may extract one or more tokens provided in the subscriber response, and in turn, use the one or more tokens as a value for the slot associated with such prompt. That is, in the above non-limiting example, S230 may extract the token '3' from the subscriber, set the number of automated purchase order decisioning routes to generate to '3', and/or instantiate a corresponding number of automated purchase order decisioning routes. In some embodiments, based on extracting the number of automated purchase order decisioning routes to generate, the conversational dialogue agent may add, to the unfilled route slot list, a set of unfilled route slots for each of the generated automated purchase order decisioning route (e.g., an unfilled route execution condition slot and route action slot for each of the requested routes).

Furthermore, in some embodiments and based on identifying the valid subscriber response to the prompt, S230 may function to remove the route slot associated with the prompt from the unfilled route list and prompt the user for a subsequent or next unfilled route slot in the unfilled dialogue list. For instance, in a non-limiting example with continued reference to the above example, the unfilled route dialog list may include a route execution condition slot and route action slot for each of the requested automated purchase order decisioning routes. Thus, in such embodiments, the conversational dialogue agent may generate a prompt requesting that the subscriber provide the route execution condition for a respective one of the automated purchase order decisioning routes to be generated (e.g., "Please provide the route execution condition(s) for the first automated purchase order decisioning route").

The subscriber response to such prompt, in some embodiments, may include one or more Boolean expressions that defines when the respective one of the automated purchase order decisioning routes may be executed. Thus, in such embodiments, S230 may extract the one or more Boolean expressions from the subscriber response and use the one or more Boolean expressions as the route execution condition for the respective one of the automated purchase order decisioning routes. It shall be noted that S230 may follow similar processes or operations for the other automated purchase order decisioning routes that have unfilled route slots.

Additionally, or alternatively, in some embodiments, the conversational dialogue agent may, for analogous reasons, prompt the subscriber for the unfilled route actions slot associated with the respective one of the automated purchase order decisioning route. Thus, in such embodiments, the conversational dialogue agent may generate a prompt requesting that the subscriber provide the route action slot for the respective one of the automated purchase order decisioning routes to be generated (e.g., "Please provide the actions to performs when the first automated purchase order decisioning route is executed").

Based on subscriber response to such prompt, in some embodiments, may cause S230 to configure the respective one of the automated purchasing decisioning to perform one or more actions when executed, such as an action that automatically accepts/approves a routed digital purchase order artifact, automatically declines/rejects the routed digital purchase order artifact, automatically sends the routed digital purchase artifact to one or more target entities for manual review, etc.

2.40 Configuring an Automated Correspondence & Transactional Artifact Generation Module S240, which includes configuring an automated correspondence and transactional artifact generation module, may function to configure, adapt, train, and/or tune a large language model to automatically generate correspondence messages and transactional artifacts for the subscriber. As will be described in more detail in S250, the automated correspondence and transactional artifact generation module, when implemented, may function to receive a corpus of correspondence feature data as input and, in turn, generate a distinct digital correspondence/electronic communication in accordance with the features defined within such corpus. Furthermore, in some embodiments and as will also be described in more detail in S250, the automated correspondence generation module, when implemented, may additionally or alternatively function to receive a corpus of transactional artifact feature data (e.g., contract feature data) as input and, in turn, generate a distinct digital transactional artifact in accordance with features defined within such corpus.

It shall be noted that, in some embodiments, if S240 configures the above-described module to (e.g., only) generate correspondence messages, then such module may be simply referred to as "an automated correspondence generation module" in some portions of the disclosure." Likewise, in some embodiments, if S240 configures the above-described module to (e.g., only) generate transactional artifacts, then such module may be simply referred to as "an automated transactional artifact generation module" in some portions of the disclosure.

Thus, such an automated correspondence and transactional artifact generation module may enable the subscriber to generate electronic communications and/or transactional artifacts based on specifying particular objectives, features, goals, or desired content of the subscriber, which may substantially reduce or eliminate the burden on the subscriber since the subscriber may no longer need to manually compose such artifact (e.g., manually compose sentences, paragraphs, contract clauses, contract positions, or the like).

Implementing a Scenario Distillation Layer

Figure 4:
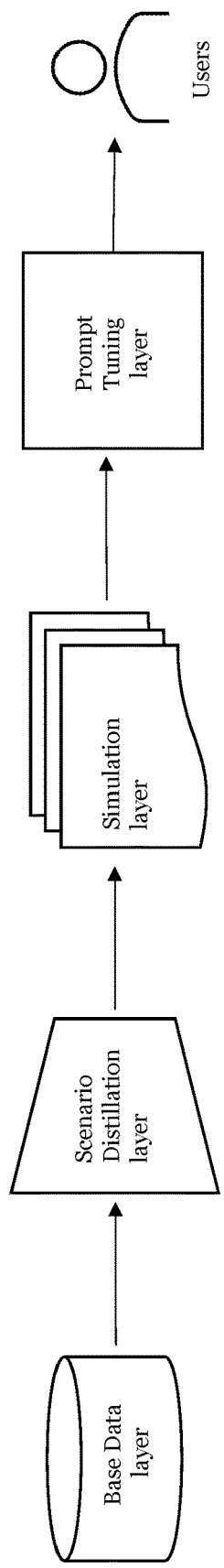
FIG. 4 illustrates a schematic for configuring a scenario distillation layer and an artifact simulation layer in accordance with one or more embodiments of the present application.

In some embodiments, configuring the automated correspondence and transactional artifact generation module may include implementing a scenario distillation layer (as generally illustrated in FIG. 4). The scenario distillation layer, in some embodiments, may relate to a data structure or a repository that stores a collection of exemplarily correspondences, a collection of exemplarily transactional artifacts (e.g., contracts), a knowledge base of terms commonly used by the subscriber, an industry, and/or the like (and, optionally, the possible variations/permutations thereof). Additionally, or alternatively, in some embodiments, the knowledge base of terms underlying the scenario distillation layer may include a dictionary of terms commonly associated with a particular scenario, objective, or goal; a corpus of terms commonly used in the exemplarily correspondences or transactional artifacts; and/or the like.

In one implementation, the collection or corpus of exemplarily correspondences stored within the scenario distillation layer may include a corpus of exemplarily procurement negotiation correspondences. The corpus of exemplarily procurement negotiation correspondences (e.g., a first distinct artifact synthetization objective), in some embodiments, may include artifacts that a subscriber or user has used to successfully negotiate with one or more target entities (e.g., suppliers), such as documents, emails, text messages, etc. that the subscriber used to achieve more favorable terms on a quote, purchase, or the like from the target entity.

In some embodiments, when compared to one another, each of the procurement negotiation correspondences included in the corpus of exemplarily procurement negotiation correspondences may define (different or distinct) negotiation positions, conditions, scenarios, stances, or preferences of the subscriber. For instance, in a non-limiting example, at least a subset of the negotiation correspondences included in the corpus of exemplarily negotiation correspondences may include requests for a different discount percentage or rate from the entity or supplier, requests for a different payment term from the entity or supplier, requests for different volume discount terms form the entity or supplier, requests for different auto renewal terms from the entity or supplier, requests for different cancelation terms from the entity or supplier, and/or the like.

In a second implementation, the collection or corpus of exemplarily correspondences stored within the scenario distillation may include a corpus of exemplarily transactional artifact negotiation correspondences. The corpus of exemplarily transactional artifact negotiation correspondences (e.g., a second distinct artifact synthetization objective), in some embodiments, may include artifacts that a subscriber or user used to successfully negotiate positions or clauses within a target transactional artifact, such as documents, emails, text messages, and/or the like that the subscriber used to achieve more favorable terms on a contract or agreement between the subscriber and the target entity.

Like above, in some embodiments, when compared to one another, each of the transactional artifact negotiation correspondences included in the corpus of exemplarily transaction negotiation correspondences may define different positions, conditions, scenarios, stances, or preferences of the subscriber. For instance, in a non-limiting example, at least a subset of the transactional artifact negotiation correspondences included in the corpus of exemplarily transactional artifact negotiation correspondences may include requests for different financial conditions, liability conditions, confidentiality conditions, termination conditions, dispute resolution conditions, damage conditions, jurisdiction conditions, and/or the like.

It shall be noted that the above implementations are not intended to be limiting and that the scenario distillation layer may include additional, fewer, or different corpora of exemplarily correspondences without departing from the scope of the disclosure contemplated herein.

For instance, in a third implementation, the collection or corpus of exemplarily artifacts stored within the scenario distillation layer may include a corpus of exemplarily transactional artifacts (e.g., contracts). The corpus of exemplarily transactional artifacts, in some embodiments, may include artifacts that a subscriber has used to transact with a target entity (e.g., supplier), such as one or more procurement contracts, non-disclosure agreements, or any other suitable type of agreement or contract.

In some embodiments, when compared to one another, each of the transactional artifacts included in the corpus of exemplarily transactional artifacts may define different transaction positions, conditions, clauses, scenarios, stances, or preferences of the subscriber. For instance, in a non-limiting example, at least a subset of the transactional artifacts of the corpus may include different financial positions or clauses, liability positions or clauses, confidentiality positions or clauses, termination positions or clauses, dispute resolution positions or clauses, damage position or clauses, jurisdiction positions or clauses, and/or the like.

Implementing a Correspondence and Transaction Data Simulation Layer

In some embodiments, configuring the automated correspondence and transactional artifact generation module may include implementing a correspondence and transactional artifact data simulation layer (as also illustrated in FIG. 4). The correspondence and transactional artifact data simulation layer, in some embodiments, may function to generate synthetic, but realistic, variations of the (original) correspondences stored within the scenario distillation layer and/or may function to generate synthetic, but realistic, variations of the (original) transactional artifacts stored within the scenario distillation layer. Thus, in some embodiments, the usage of the correspondence and transactional artifact data simulation layer may be particularly advantageous in improving the output/performance of the large language model when the scenario distillation layer includes a low amount of data (e.g., a low number of original correspondences, a low number of original transactional artifacts, etc.).

In some embodiments, the correspondence data simulation layer may implement a large language model to generate synthetic variations of the original correspondences and/or the original transactional artifacts stored within the scenario distillation layer. In such embodiments, S240 may generate a plurality of inputs (e.g., prompts) that requests the large language model to vary one or more positions, stances, and/or conditions defined within an original correspondence transactional artifact. For instance, in a non-limiting example, a (real) procurement negotiation correspondence stored within the scenario distillation layer may relate to a correspondence between the subscriber and a target entity that requests that a provided quote be discounted by a respective amount (e.g., 15%) and that the payment terms be set to a specified number of days after receipt (e.g., 30 days).

Thus, in such a non-limiting example, S240 may generate a prompt to the large language model that requests that the (real or original) procurement negotiation correspondence be rewritten to include a different discount amount (e.g., 30%) and a different number of days after receipt (e.g., 60 days). In some embodiments, based on receiving the prompt, the large language model may, in turn, function to generate a synthetic variation of the original procurement negotiation correspondence that can be further used during model training (and/or added to the scenario distillation layer). It shall be noted that S240 may generate similar or analogous prompts for each of the transactional artifacts stored in the scenario distillation layer (e.g., but the prompts may instead be directed to permutations of contract clauses).

Furthermore, in some embodiments, S240 may generate a plurality of prompts for each correspondence or transactional artifact stored within the scenario distillation layer to expose the large language model to a variety of (or all) possible permutations of the stances, conditions, positions, or the like associated with such artifacts. It shall be noted that, in some embodiments, S240 may tune the data simulation prompts over time based on user feedback, such as success rate of the generated correspondence, time savings related to the generated correspondence, transaction (e.g., contract) cycle time. In such embodiments, S240 may implement one or more reinforcement learning from human preferences (RLHP) machine learning models that model user actions and metrics as model rewards.

In other words, in some embodiments, the simulation data layer may comprise a large language model that is trained on real subscriber data and synthetic subscriber data derived from the real subscriber data. The data simulation layer may function to generate the synthetic subscriber data by obtaining, from the synthetization objective distillation layer, a corpus of features and possible feature values of each feature in the corpus, generating one or more synthetic subscriber data creation prompts that comprises a real subscriber data and a request to rewrite one or more features defined in the real subscriber data with different feature values, and/or generating the synthetic subscriber data based on providing the one or more synthetic subscriber data creation prompts as input to the large language model.

2.50 Constructing Digital Correspondence Creation Prompts||Constructing Transactional Artifact Creation Prompts S250, which includes automatically composing digital correspondences and transactional artifacts prompts, may function to construct one or more prompts that, when executed, cause the automated correspondence and transactional artifact generation module (described in S240) to synthesize one or more digital correspondences and/or transactional artifacts for the subscriber. In some embodiments, the one or more digital correspondences and/or transactional artifacts may be automatically generated or synthesized based on (e.g., as result of) S250 providing the one or more prompts as input to a large language model underpinning the automated correspondence and transactional artifact generation module configured in S240.

That is, in some embodiments, the large language model underpinning the automated correspondence and transactional artifact generation module may be configured to receive a correspondence creation prompt as input and, in turn, generate a distinct digital correspondence/electronic communication in accordance with the prompt provided as input. Furthermore, in some embodiments, the large language model underpinning the automated correspondence and transactional artifact generation module may additionally, or alternatively, be configured to receive a transactional artifact creation prompt as input and, in turn, generate a distinct digital transactional artifact in accordance with the prompt provided as input.

Constructing a Digital Correspondence Creation Prompt

In some embodiments, a digital correspondence creation prompt may be created by a set of target computer-executable artifact synthetization prompt creation instructions. In one example of such embodiments, such computer-executable instructions may function to define a corpus of correspondence feature data. The corpus of correspondence feature data, in some embodiments, may define particular objectives, features, goals, outcomes, or desired content that the subscriber is requesting to be represented or incorporated in the digital correspondence artifact that will be outputted by the automated correspondence and transactional artifact generation module ("target digital correspondence artifact"). For instance, in a non-limiting example, the corpus of correspondence feature data included in the digital correspondence creation prompt may include, but should not be limited to, a feature identifying a recipient of the target digital correspondence artifact, a feature identifying a target discount rate requested by the subscriber, a feature identifying a request for a volume discount, a feature identifying a requested payment term, and/or the like. It shall be noted that these feature are not intended to be limiting and that additional, different, or fewer features may be included in the feature data corpus without departing from the scope of the disclosure contemplated herein.

For instance, in the example illustrated in FIG. 5, S250 illustrates the corpus of correspondence feature data used for constructing a target digital correspondence creation prompt ("recipient": "Charlotte", "discount_rate":"30%", "volume_discount_qnty":"10", "payment_term":"30 days"). Accordingly, as also illustrated in FIG. 5, S250 shows an example digital correspondence synthesized by the automated correspondence and transactional artifact generation module as a result of (e.g., based on, in response to, etc.) S250 providing the prompt to such module.

For instance, in a non-limiting example, the corpus of correspondence feature data included in the digital correspondence creation prompt may include, but should not be limited to, a feature identifying a recipient of the target digital correspondence artifact, a feature identifying a target discount rate requested by the subscriber, a feature identifying a request for a volume discount, a feature identifying a request for requested payment term, and/or the like. It shall be noted that these feature are not intended to be limiting and that additional, different, or fewer features may be included in the feature data corpus without departing from the scope of the disclosure contemplated herein. It shall be noted that, in some embodiments, setting the values of the features in the corpus of feature data may be referred to as "setting programmable synthetization arguments" or the like.

For instance, in the example illustrated in FIG. 5, S250 illustrates the corpus of correspondence feature data used for constructing a target digital correspondence creation prompt ("recipient": "Charlotte", "discount_rate":"30%", "volume_discount_qnty":"10", "payment_term":"30 days"). Accordingly, as also illustrated in FIG. 5, S250 shows an example digital correspondence outputted by the automated correspondence and transactional artifact generation module as a result of (e.g., based on, in response to, etc.) S250 providing the prompt to such module.

In another non-limiting example, the corpus of correspondence feature data included in the digital correspondence creation prompt may include, but should not be limited to, a feature identifying a recipient of the target digital correspondence artifact, a feature identifying a jurisdiction requested for a target transactional artifact, a feature identifying requested duration of the target transactional artifact, and/or the like. It shall be noted that these feature are not intended to be limiting and that additional, different, or fewer features may be included in the feature data corpus without departing from the scope of the disclosure contemplated herein.

For instance, in the example illustrated in FIG. 6, S250 illustrates the corpus of correspondence feature data used for constructing a target digital correspondence creation prompt ("recipient": "Charlotte", "jurisdiction": "New York", "duration": "5 years"). Accordingly, as also illustrated in FIG. 6, S250 shows an example digital correspondence outputted by the automated correspondence and transactional artifact generation module as a result of (e.g., based on, in response to, etc.) S250 providing the prompt to such module.

It shall be noted that, in some embodiments, S250 may define the corpus of correspondence feature data may be derived based on adaptations that a subscriber made to one or more target artifacts. The adaptations that the subscriber may perform to the one or more target artifacts may be detected and/or tracked using any suitable manner including, but not limited to, the methods defined in U.S. patent application Ser. No. 17/990,252 titled "MACHINE LEARNING-BASED SYSTEMS AND METHODS FOR IDENTIFYING AND RESOLVING CONTENT ANOMALIES IN A TARGET DIGITAL ARTIFACT," which is incorporated in its entirety by this reference.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for composing a plurality of artifact synthetization prompts for synthesizing a plurality of digital artifacts, the method comprising:
identifying, via one or more computers, unstructured conversational dialogue data sourced from communications between a subscriber and a conversational dialogue agent, wherein the conversational dialogue data comprises a plurality of distinct unstructured data synthetization requests;
automatically mapping, via the one or more computers, each of the plurality of distinct unstructured data synthetization requests to a distinct artifact synthetization objective of a plurality of distinct artifact synthetization objectives defined within a synthetization objective distillation layer, wherein each of the plurality of distinct synthetization objectives is stored in association with:
  (i) computer-executable artifact synthetization prompt creation instructions that, when executed, generates an artifact synthetization prompt for synthesizing a target digital artifact, and
  (ii) a corpora of synthetization parameters required by the computer-executable artifact synthetization prompt creation instructions;
generating, via the one or more computers, a plurality of artifact synthetization prompts corresponding to the plurality of unstructured data synthetization requests based on the distinct artifact synthetization objective mapped to each of the plurality of distinct unstructured data synthetization requests, wherein the generating includes:
  (a) extracting, from the unstructured conversational dialogue data, a plurality of synthetization values for the corpora of synthetization parameters required by the distinct artifact synthetization objective;
  (b) setting programmable synthetization arguments defined in the computer-executable artifact synthetization prompt creation instructions associated with the distinct artifact synthetization objective based on the plurality of synthetization values extracted from the unstructured conversational dialogue data; and
  (c) executing the computer-executable artifact synthetization prompt creation instructions associated with the distinct artifact synthetization objective mapped to each of the plurality of distinct unstructured data synthetization requests based on the setting of the programmable synthetization arguments defined in the computer-executable artifact synthetization prompt creation instructions; and
generating, by a target machine learning model, a plurality of synthesized digital artifacts based on an input of the plurality of artifact synthetization prompts generated for the plurality of unstructured data synthetization requests.

2. The method of claim 1, wherein:
each of the plurality of artifact synthetization prompts defines a corpus of features that the subscriber is requesting to be represented or incorporated in the target digital artifact synthesized by the target machine learning model, and
the corpus of features that the subscriber is requesting to be represented or incorporated in the target digital artifact is further derived based on adaptations that the subscriber made to one or more target artifacts received from a target entity.

3. The method of claim 1, wherein:
the target machine learning model comprises a large language model, and
the large language model is configured to receive each of the plurality of artifact synthetization prompts as input and generate, as output, a synthesized digital artifact for each of the plurality of artifact synthetization prompts provided as input.

4. The method of claim 3, wherein:
the target machine learning model composes one or more words, sentences, and paragraphs based on feature data defined in each respective synthetization prompt, and
the feature data defines one or more values for one or more features that the subscriber is requesting to be represented in the target digital artifact synthesized by the target machine learning model.

5. The method of claim 1, wherein:
the target machine learning model comprises a large language model that is trained on real digital correspondence data associated with the subscriber and synthetic correspondence data derived from the real digital correspondence data,
a correspondence data simulation layer generates the synthetic correspondence data, and
generating the synthetic correspondence data via the correspondence data simulation layer includes:
  obtaining, from the synthetization objective distillation layer, a corpus of procurement correspondence features and possible feature values of each procurement correspondence feature in the corpus of procurement correspondence features;
  generating one or more synthetic correspondence creation prompts that comprises a real digital correspondence and a request to rewrite one or more procurement correspondence features defined in the real digital correspondence with different feature values; and
  generating the synthetic correspondence data based on providing the one or more synthetic correspondence creation prompts as input to the large language model.

6. The method of claim 1, wherein:
a respective one of the plurality of unstructured data synthetization requests is mapped to a digital correspondence synthetization request,
an artifact synthetization prompt generated for the respective one of the plurality of unstructured data synthetization requests includes: (1) a recipient feature, (2) a requested discount rate feature, (3) a requested volume discount feature, and (4) a requested payment term feature, and
the target machine learning model automatically composes one or more words, sentences, and paragraphs based on the recipient feature, the requested discount rate feature, and the requested volume discount feature.

7. The method of claim 1, wherein:
a respective one of the plurality of unstructured data synthetization requests is mapped to a transactional artifact adaptation correspondence synthetization request,
an artifact synthetization prompt corresponding to the respective one of the plurality of unstructured data synthetization requests includes: (1) a recipient feature, (2) a requested jurisdiction feature, (3) a requested contract duration feature, and
the target machine learning model automatically composes one or more words, sentences, and paragraphs based on the recipient feature, the requested jurisdiction feature, and the requested contract duration feature.

8. The method of claim 1, wherein:
the target machine learning model comprises a large language model that is trained on real transactional artifact data associated with the subscriber and synthetic transactional artifact data derived from the real transactional artifact data,
a transactional artifact data simulation layer generates the synthetic transactional artifact data, and
generating the synthetic transactional artifact data via the transactional artifact data simulation layer includes:
  obtaining, from the synthetization objective distillation layer, a corpus of transactional artifact features and possible feature values of each feature in the corpus of transactional artifact features;
  generating one or more transactional artifact creation prompts that comprises a real transactional artifact and a request to rewrite one or more transactional artifact features defined in the real transactional artifact with different feature values; and
  generating the synthetic transactional artifact data based on providing the one or more transactional artifact creation prompts as input to the large language model.

9. The method of claim 1, wherein:
a respective one of the plurality of distinct unstructured data synthetization requests is automatically mapped to a digital correspondence synthetization objective,
the target digital artifact synthesized via the computer-executable artifact synthetization prompt creation instructions associated with the digital correspondence synthetization objective comprises a synthesized response to digital quote data provided by a target procurement supplier, and
the corpora of synthetization parameters required by the computer-executable artifact synthetization prompt creation instructions include:
  (1) a synthetization parameter identifying a recipient to identify in the response to the digital quote data,
  (2) a synthetization parameter identifying a discount amount to request in the synthesized response to the digital quote data,
  (3) a synthetization parameter identifying a volume discount amount to request in the synthesized response to the digital quote data, and
  (4) a synthetization parameter identifying a payment term to request in the synthesized response to the digital quote data.

10. The method of claim 1, wherein:
a respective one of the plurality of distinct unstructured data synthetization requests is automatically mapped to a digital correspondence synthetization objective,
the target digital artifact synthesized via the computer-executable artifact synthetization prompt creation instructions associated with the digital correspondence synthetization objective comprises a synthesized response to transactional artifact data provided by a target entity, and the corpora of synthetization parameters required by the computer-executable artifact synthetization prompt creation instructions include:
- (1) a synthetization parameter identifying a recipient to identify in the synthesized response to the transactional artifact data,
- (2) a synthetization parameter identifying a jurisdiction to request in the synthesized response to the transactional artifact data, and
- (3) a synthetization parameter identifying a time duration to request in the synthesized response to the transactional artifact data.

11. A computer-implemented method comprising:

identifying unstructured conversational dialogue data sourced from communications between a subscriber and a conversational dialogue agent;

automatically mapping one or more distinct unstructured data synthetization requests defined in the unstructured conversational dialogue data to a distinct artifact synthetization objective defined within a synthetization objective distillation layer;

generating a plurality of artifact synthetization prompts corresponding to the one or more distinct unstructured data synthetization requests based on the distinct artifact synthetization objective mapped to each of the one or more distinct unstructured data synthetization requests; and generating, by a target machine learning model, a plurality of synthesized digital artifacts based on an input of the plurality of artifact synthetization prompts generated for the plurality of unstructured data synthetization requests, wherein:
- the target machine learning model comprises a large language model that is trained on real subscriber data and synthetic subscriber data derived from the real subscriber data,
- a data simulation layer generates the synthetic subscriber data, and
- generating the synthetic subscriber data via the data simulation layer includes:
  - obtaining, from the synthetization objective distillation layer, a corpus of features and possible feature values of each feature in the corpus,
  - generating one or more synthetic subscriber data creation prompts that comprises the real subscriber data and a request to rewrite one or more features defined in the real subscriber data with different feature values, and
  - generating the synthetic subscriber data based on providing the one or more synthetic subscriber data creation prompts as input to the large language model.

12. The computer-implemented method of claim 11, wherein:

the synthetization objective distillation layer defines a plurality of distinct artifact synthetization objectives, and each of the plurality of distinct synthetization objectives comprises:
- (i) computer-executable artifact synthetization prompt creation instructions that, when executed, generates a target artifact synthetization prompt, and
- (ii) a corpora of synthetization parameters required by the computer-executable artifact synthetization prompt creation instructions.

13. The computer-implemented method of claim 11, wherein the generating the plurality of artifact synthetization prompts includes:

extracting, from the unstructured conversational dialogue data, a plurality of synthetization values for a plurality of synthetization parameters required by the distinct artifact synthetization objective;

setting programmable synthetization arguments defined in computer-executable artifact synthetization prompt creation instructions associated with the distinct artifact synthetization objective mapped to each of the plurality of distinct unstructured data synthetization requests based on the plurality of synthetization values extracted from the unstructured conversational dialogue data; and executing the computer-executable artifact synthetization prompt creation instructions associated with the distinct artifact synthetization objective mapped to each of the plurality of distinct unstructured data synthetization requests based on the setting of the programmable synthetization arguments.

14. The computer-implemented method of claim 11, wherein:

the target machine learning model composes one or more words, sentences, and paragraphs based on feature data defined in a respective artifact synthetization prompt, and the feature data defines one or more values for one or more features that the subscriber is requesting to be represented in a target digital artifact synthesized by the target machine learning model.

15. The computer-implemented method of claim 11, wherein the data simulation layer is (1) an intermediary between the subscriber and the large language model and (2) enables the subscriber to adapt the large language model according to one or more subscriber training preferences or goals.

16. The computer-implemented method of claim 11, further comprising:

defining a base data layer for the conversational dialogue agent and the target machine learning model, wherein defining the base data layer includes:
- sourcing a plurality of unstructured artifacts from the subscriber,
- converting the plurality of unstructured artifacts to a corpora of structured data, and
- automatically defining, in the base data layer, a plurality of synthetization policies that constrain synthetization operations of the conversational dialogue agent and the target machine learning model.

17. A computer-implemented method for composing a plurality of artifact synthetization prompts for synthesizing a plurality of digital artifacts, the computer-implemented method comprising:

identifying, via one or more computers, unstructured conversational dialogue data;

generating, via the one or more computers, a plurality of artifact synthetization prompts based on the unstructured conversational dialogue data, wherein the generating includes:
- (a) extracting, from the unstructured conversational dialogue data, a plurality of synthetization values from the unstructured conversational dialogue data;

(b) setting programmable synthetization arguments defined in computer-executable artifact synthetization prompt creation instructions based on the plurality of synthetization values extracted from the unstructured conversational dialogue data; and (c) executing the computer-executable artifact synthetization prompt creation instructions based on the setting of the programmable synthetization arguments; and generating, by a target machine learning model, a plurality of synthesized digital artifacts based on an input of the plurality of artifact synthetization prompts.

18. The computer-implemented method of claim 17, wherein generating the plurality of artifact synthetization prompts further includes:

automatically mapping, via the one or more computers, each of a plurality of distinct unstructured data synthetization requests defined in the unstructured conversational dialogue data to a distinct artifact synthetization objective of a plurality of distinct artifact synthetization objectives defined within a synthetization objective distillation layer.

19. The computer-implemented method of claim 17, wherein:

the target machine learning model comprises a large language model that is trained on real subscriber data and synthetic subscriber data derived from the real subscriber data, a data simulation layer generates the synthetic subscriber data, and generating the synthetic subscriber data via the data simulation layer includes:

obtaining, from a synthetization objective distillation layer, a corpus of features and possible feature values of each feature in the corpus;

generating one or more synthetic subscriber data creation prompts that comprises the real subscriber data and a request to rewrite one or more features defined in the real subscriber data with different feature values; and generating the synthetic subscriber data based on providing the one or more synthetic subscriber data creation prompts as input to the large language model.

\* \* \* \* \*